Figure 1:
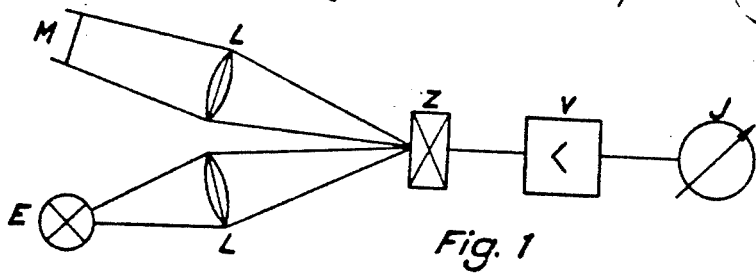

June 14, 1955  H. HEITMULLER ET AL  2,710,559
DEVICE FOR MEASURING THE INTENSITY OF RADIATIONS
Filed April 29, 1950                              4 Sheets-Sheet 1

Inventors
MANFRIED HEITMÜLLER
PETER ORLICH
By
ATTORNEY

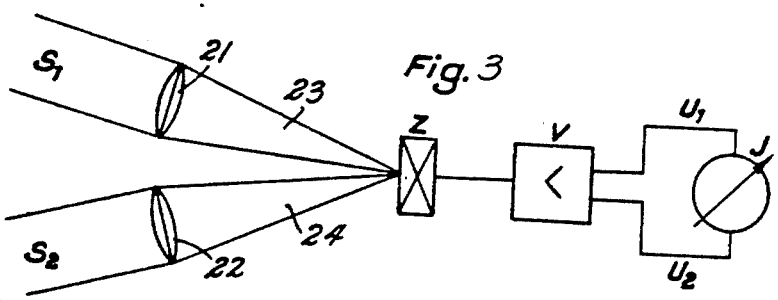
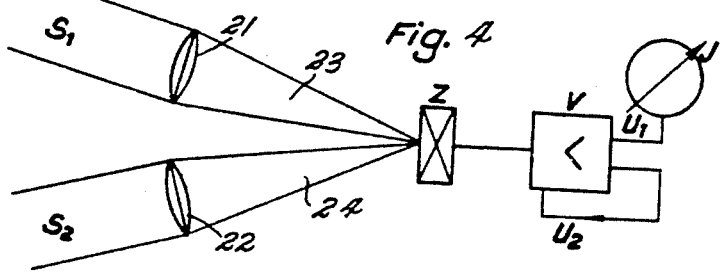
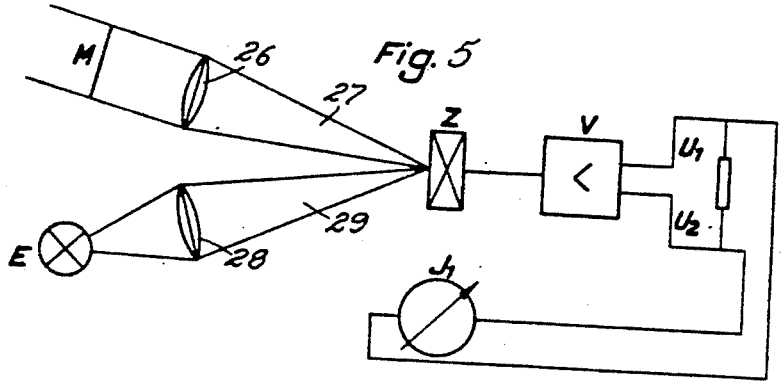
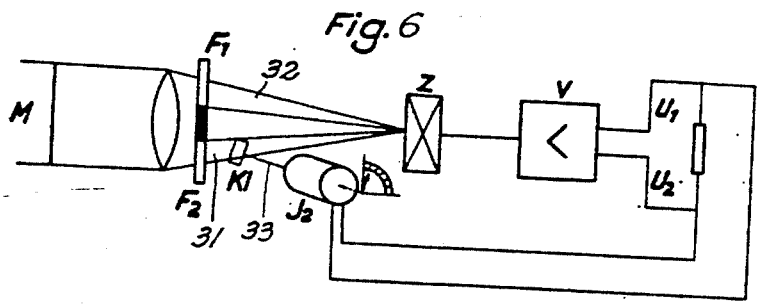

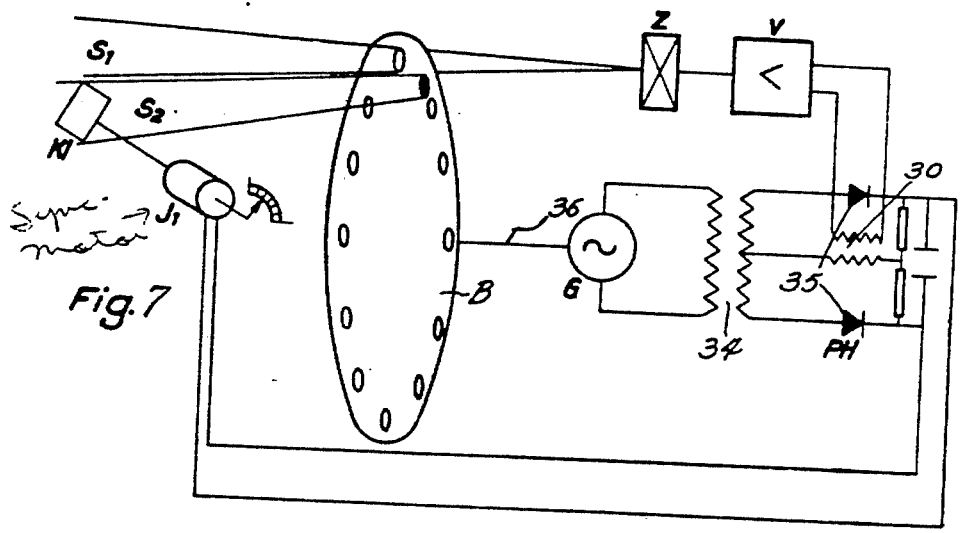
Fig. 7
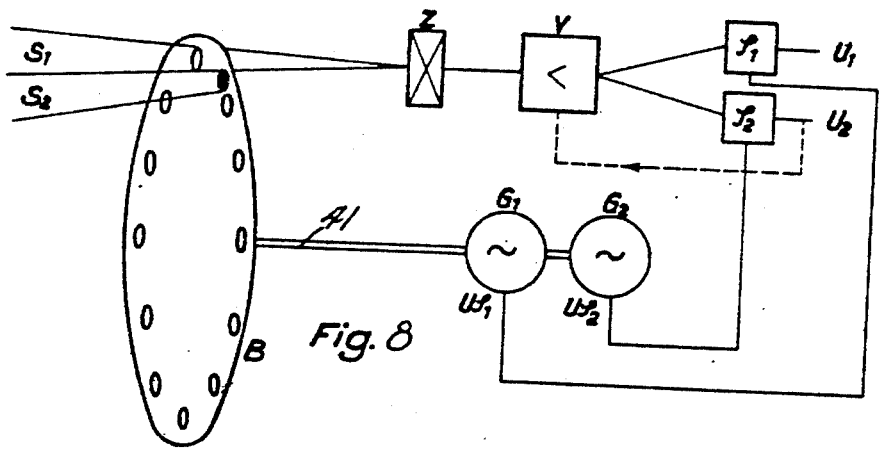
Fig. 8
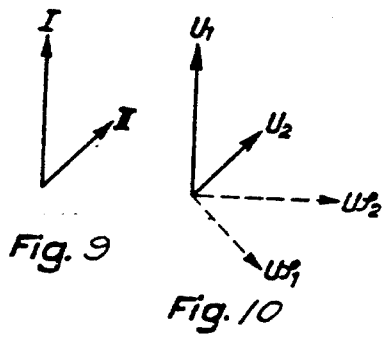
Fig. 9
Fig. 10
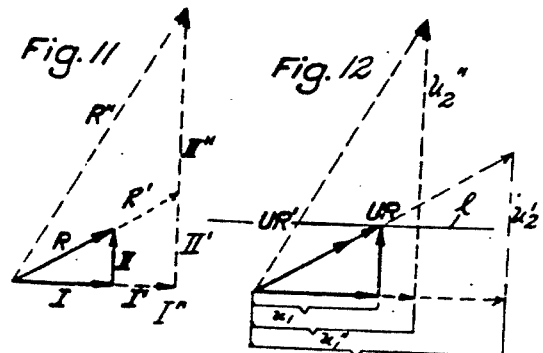
Fig. 11
Fig. 12
Inventors:
HANFRIED HEITMÜLLER
PETER OHRLICH
By E. Z. Freeman
ATTORNEY.

United States Patent Office 2,710,559
Patented June 14, 1955

2,710,559

DEVICE FOR MEASURING THE INTENSITY OF RADIATIONS

Hanfried Heitmuller and Peter Orlich, Kiel-Wik, Germany, assignors to Paul Ferd. Peddinghaus, Gevelsberg, Germany Application April 29, 1950, Serial No. 158,976

Claims priority, application Germany October 27, 1949

1 Claim. (Cl. 88—22.5)

This invention relates to a device for measuring or determining the intensity or other characteristics of one or more radiations by comparing them with each other or with a source of reference radiation, and particularly relates to a radiation measuring device of this character which utilizes a chopper or modulator.

It is known to measure the intensity of a source of radiation such as the surface of a hot body by means of a receiver of radiation such as a photoelectric cell by utilizing the substitution method. Thus the radiation to be measured and a reference radiation are alternately directed onto the receiver device. By virtue of this substitution variations of the receiver device and of the electric circuit connected thereto as well as the varying influence of the medium through which the rays pass, are eliminated. However, this concentrical substitution process has the drawback that the measurement requires a comparatively long time.

Suggestions have been made to chop or modulate the radiation which is received by a photoelectric cell or similar device so that an alternating current amplifier may be used which has well known advantages as compared to a direct current amplifier and which may be arranged in particular to have a larger amplification factor.

It is accordingly an object of the invention to provide a process of and apparatus for measuring radiation which is substantially inertialess so that the result of the measuring may be instantly read or indicated.

A further object of the invention is to provide an improved process of and apparatus for measuring radiations which may be utilized for controlling directly a device or apparatus.

Such measurement or control could not be effected by the use of the known substitution method.

Moreover, the known devices by which instantaneous measurement may be obtained are not sufficiently accurate and therefore do not permit a constant control and calibration of the entire measuring device.

In accordance with this invention a device for comparing measuring magnitudes and preferably the intensities of radiations which travel over two or more geometrically separate paths is combined with means in the separate ray paths which chop or modulate the radiations to be compared at different frequencies or at the same frequency but with a different phase. A common receiver is provided for all radiations which transforms the magnitudes of the radiations into electric signals and preferably voltages. These voltages are impressed onto a segregation device which is supplied with one or more auxiliary frequencies; this device segregates the voltages corresponding to the different radiations in accordance with their different frequencies or phases and impresses them on a measuring or control device or on a combination of such devices.

In accordance with the invention a considerably higher measuring speed is obtained because the voltages which are to be compared and which are periodically interrupted, are directed simultaneously onto the receiver device so that no time is lost by substitution of one source for another. In order to further increase the measuring speed it is preferred to utilize a receiver device which is as inertialess as possible. Preferably the receiver device is connected to an amplifier, for instance, an alternating current amplifier.

This invention is successfully applicable to metallurgical work, for instance, to the control of metal hardening, tempering, annealing, welding and melting procedures; it may well be used for the control of metal heating and annealing devices, of metal surface hardening and quenching machines and the like. The invention may be used for the control of the working temperature in a rolling unit, in a metal tempering and annealing installation, in a metal casting plant, where metal baths must be heated to an equal temperature.

Furthermore it is to be understood that the radiations need not all originate from different radiation sources. Thus different radiations of the same type may be obtained from the same radiation source by deflection means and over different ray paths. The importance of the invention is particularly apparent when two or more radiation components are obtained which belong to different spectral regions for analyzing the radiation source or the concentration and composition of the medium through which the rays pass or for measuring the temperature of the radiation source by eliminating the coefficient of emission. If different radiation sources are used it is preferred to provide a reference source.

The invention will now be described more in detail and with reference to the appended drawings.

In the drawings

Figure 2:
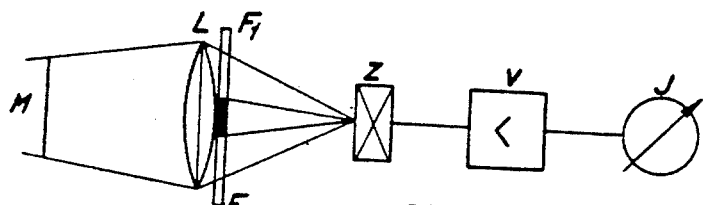
Figure 13:
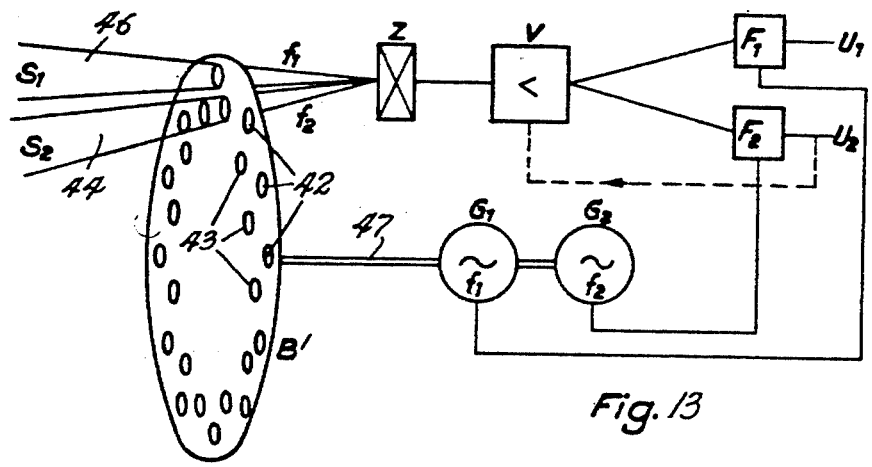
Figure 14:
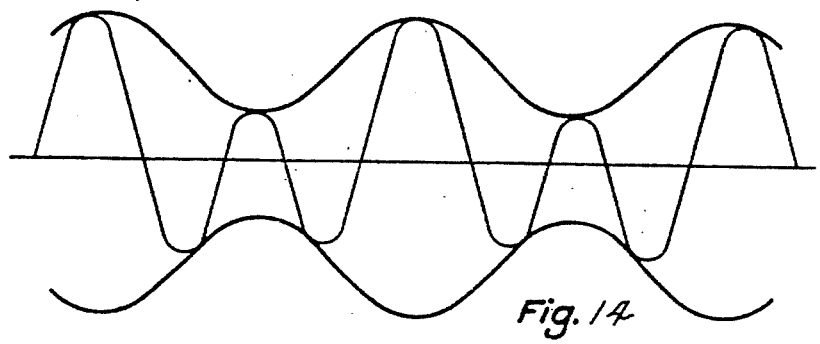
Figure 15:
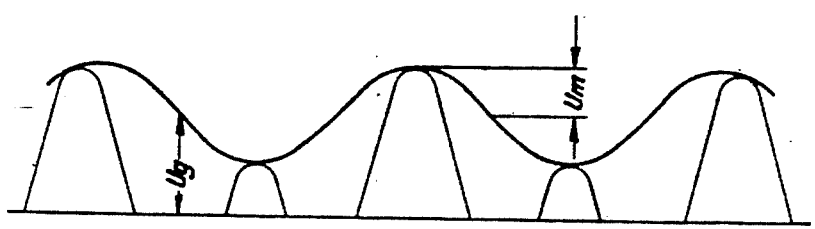

Figs. 1 and 2 are schematic representations of different embodiments of the invention showing different arrangements of the radiation paths, Figs. 3 to 6 are schematic representations of embodiments of the invention illustrating various modifications of the measuring and indicating means thereof, Figs. 7, 8, 13 and 16 illustrate schematically different choppers and means for segregating the different voltages produced by the various rays in the receiver, Figs. 14 and 15 are graphs showing curves referred to in explaining the operation of the invention and Figs. 9, 10, 11 and 12 are vector diagrams which will be referred to hereinafter.

Fig. 1 illustrates a general arrangement of the radiation measuring device the rays traveling over two paths. For the sake of simplicity all embodiments of the invention will be confined to the simple case where the rays travel over two different paths only.

The object to be measured is indicated at M and may consist of the surface of a hot body. The source of reference radiation is indicated at E. The rays from the two sources are focused by lens L along different geometrically separate paths, as explained below, on a common receiver device, such as a photoelectric cell Z which is connected through amplifier V to a measuring or indicating meter J.

The means for modulating the rays and for segregating the modulated signals or voltages are omitted from Figs. 1 and 2 for the sake of simplicity.

By utilizing a reference radiation source the variable sensitivity of photoelectric cell Z of the transmission channel connected therewith, such as amplifier V is eliminated.

Furthermore, all changes of the medium between the object to be measured and the receiver through which the rays travel are eliminated provided the two ray paths are adjacent to each other and pass through a common medium.

Fig. 2 shows another embodiment of the invention with a single radiation source M. Two spectral filters F1 and F2 are disposed in the path of the rays which filter two different spectral regions from the radiation source. In this case the two spectral components are compared to each other.

By splitting the rays of an object to be measured into two spectral distinct regions it is possible, for example, to measure the temperature of a gray body. It is well known that the radiation of a gray body does not deviate from the radiation of a black body in its relative spectral distribution but only by the coefficient of emission. If the total emission of a gray body is measured, an erroneous result is obtained unless the coefficient of emission is known. However, if two spectral regions are segregated by means of optical filters, the energies passed by the two filters may be compared. The ratio of the two energies is independent of the coefficient of emission and has a certain value for each temperature because the distribution of the energy for each wave length changes with the temperature in accordance with a well known law.

A comparative measurement of two channels of different spectral ranges permits not only to determine the temperature independent from the emission coefficient of the body but also eliminates variation due to changes of the sensitivity of the measuring device.

A further application of the spectral segregation of the rays of a body into two channels is the measurement of the absorption of a medium or the investigation of the concentration of certain materials in the medium.

A further application of the comparative measurement of two magnitudes for measuring radiations is the comparison of the absorption of two media, for example, for the titration of liquids. In this case, the radiation of a source is passed through the two liquids to be measured instead of through two filters.

It should be pointed out that the comparison of different absorption media need not necessarily be performed with rays of different frequency. Sometimes a frequency band may be used for this purpose which is more or less narrow and which is the same for all ray paths.

The measuring arrangement of this invention will now be explained with reference to Figs. 3 to 5 particularly.

Referring now particularly to Fig. 3, S1 and S2 indicate the two radiations which are focused as explained below on receiver or photoelectric cell Z by means of lenses 21 and 22 over separate paths 23 and 24, respectively. From the output of the amplifier two voltage components U1 and U2 are derived by means of filter means, not shown. The two voltage components are proportional to the two radiation intensities S1 and S2 and are impressed on a ratio meter J. The ratio meter indicates directly the ratio of the two components U1 and U2. The ratio meter may be calibrated in the desired units such as the temperature. This process is independent from the transmission level of the arrangement. It is necessary that the amplifier V transmits direct as well as alternating current voltages.

Another circuit arrangement is shown by way of example in Fig. 4. This arangement is similar to that shown in the preceding view, and like reference numerals are used for similar parts.

By means of one of the components U2 the transmission level or gain of the circuit is maintained constant for example by electrically adjusting the amplification so that changes of the transmission level caused by changes of the sensitivity of the cell or of the amplification factor are eliminated. In the embodiment shown in Fig. 5, the two voltage components U1 and U2 are combined in opposition in the amplifier output and the difference of the two voltages or currents is utilized. A radiation source M is focused by a lens 26 in a path 27, while a standard source E is focused in a different path 29 by a lens 28 to the photoelectric cell Z. By means of meter J1 the energy, as explained below is measured which is a measure of the desired temperature of the object M to be measured. If desired, meter J1 may be calibrated in units of a desired quantity.

The three arrangements just described and shown in Figs. 3, 4 and 5 are distinguished as follows. The arrangement of Fig. 3 is simply a ratio measurement which may be used directly or as a null method. The arrangement in accordance with Fig. 4 is a control of the transmission level where the intensity of the reference source remains constant and the measured voltage is an indication of the desired magnitude.

The arrangement of Fig. 5 indicated the difference between the radiation M to be measured and the reference source E of radiation. Each of the three arrangements has different advantages and disadvantages for various embodiment of the invention to be described hereinafter and these advantages and disadvantages will be pointed out during the subsequent discussion of the various embodiments.

It is also possible to combine the level and calibration adjustment in such a manner that the change of the transmission level is not effected as in Fig. 4 by a change of the transmission channel particularly of the amplifier but by a change in the transmission of the entire path of the radiation. For this purpose a flap $K_1$, aperture arrangement or the like is provided for the ray path 31, as illustrated in the example of Fig. 6. In this case a separate arrangement may be provided for each ray or suitable common aperture such as the paths 31 and 32, a grey wedge or the like may be provided for all ray paths which is suitably disposed adjacent to the receiving cell Z where the different ray paths intersect. A filter F is provided for the path 32, and a filter $F_2$ for the path 31, arranged similarly to the embodiment shown in Fig. 2. The flap $K_1$ is positioned on a shaft 33 that is turnable by a motor $J_2$ that is controlled by the output voltages $U_1$ and $U_2$.

The modulation may be effected in accordance with the invention in two different manners each of which has singular advantages for different purposes and different arrangements in accordance with the invention.

In accordance with one arrangement all modulations are of the same frequency but are shifted in phase with respect to each other. A special case to be emphasized is that for two different rays the phase shift amounts to 180° and for three rays the phase shift is 120°. A special arrangement provides a common chopper particularly an apertured disc, a rotating sector, a row of lenses, a spiral mirror arrangement, a row of mirrors or the like for several or all ray paths which obstructs or intercepts the different ray paths with different phases or, if desired, alternately. Such an arrangement is shown by way of example in Fig. 7 in the form of an apertured disc B, as explained further below. In accordance with another embodiment the apertured disc or mirror disc is provided with a plurality of apertures or rows of mirrors which intercept the different ray paths or each of which intercepts a different ray path at a different phase.

The other possibility for modulating the rays consists in modulating each radiation at a different frequency. An embodiment which utilizes this possibility is shown in Fig. 13. The apertured disc is provided with several rows of apertures which intercept the different ray paths at different frequencies. Also in this arrangement the apertured disc may be replaced by an equivalent device such, for example, as a rotating sector, a row of lenses, a spiral mirror arrangement or a row of mirrors. The most important part of the device of the invention is the separating or segregating apparatus which segregates the voltage components which are developed by the different rays in the common receiver or photoelectric cell. For the solution of this problem a number of different devices may be used. Their respective advantages are determined by selection of the described embodiment of the measuring arrangement (ratio measuring, level control or calibration control) and by the selection of the described types of modulations (modulation with the same frequency but different phase or modulation with different frequency).

A special arrangement for a simple solution in accordance with the invention is shown in Fig. 7. A pure alternating current amplifier V is used which has the advantage that it may more easily be arranged to have a higher amplification factor. A phase bridge PH is connected to the output side of the amplifier V in accordance with the invention. The phase bridge PH operates to segregate the voltages received from the sources $S_1$ and $S_2$ through the revolving disc B by the receiver device Z. It indicates not only the difference of the two voltage components but also the relative phase of the resulting voltage difference. The phase bridge PH comprises a differential transformer 34, a transformer 30 and two dry rectifiers 35. This is achieved by impressing on the phase bridge an auxiliary voltage by means of generator G, the auxiliary voltage having the same phase as the modulation. To this end the generator is disposed on a common shaft 36 with the revolving chopper disc B. The use of the generator G permits to choose the frequency of modulation different from the frequency of the network from which the amplifier receives its power. This yields the advantage that measuring errors are avoided that are usually caused by the inevitable changes of the electrical angle of a synchronous motor relative to the network. A synchronous motor is in synchronion, but not in phase coincidence, with the network. A motor $J_1$ is connected to the phase bridge in the same manner as illustrated and described in connection with Fig. 6 for turning of the flaps $K_1$ in the path of the source $S_2$.

Fig. 8 illustrates another embodiment which permits a direct indication of the ratio of two radiations $S_1$ and $S_2$, instead of indicating only the difference therebetween. In accordance with a further modification of the invention this is effected by providing a phase difference which is larger than zero degrees and smaller than 180° such, for example, as 70° in case two radiations are present which are modulated with the same frequency but with different phase. Two phase bridges $\varphi_1$ and $\varphi_2$ are connected in parallel to the output of the amplifier V that receives radiation from the sources $S_1$ and $S_2$ modulated by the disc B. The phase bridges are supplied with auxiliary voltages if frequencies which are so chosen that one of the voltage components which is shifted in phase with respect to its auxiliary voltage by 90° is either not indicated or is transmitted. A phase bridge functions like a filter with respect to an alternating current voltage which is shifted in phase by 90° with respect to the superimposed auxiliary voltage, and such a filter will not transmit this voltage. The filter action of the phase bridge is due to the fact that two voltages impressed on such a bridge and shifted in phase with respect to each other by 90° cancel each other so that a zero voltage results at the bridge output. In this manner the two individual voltage components $U_1$ and $U_2$ may be obtained from the two separate outputs of the two phase bridges. The two auxiliary voltages $U_{\varphi 1}$ and $U_{\varphi 2}$ are developed at the frequency of the modulation and with the correct phases by two generators G1 and G2 which are connected to the drive shaft 41 of the chopper disc B. The vector diagrams of Figs. 9 and 10 show the relative positions of the radiation components I and II and of the voltages U1 and U2 to be segregated as well as the auxiliary voltages $U_{\varphi 1}$ and $U_{\varphi 2}$ which are shown in dotted lines. The voltages U1 and U2 derived from the outputs of the two phase bridges may be used in one of the previously mentioned indicating circuits such as ratio measurement (Fig. 3), or level control (Fig. 5). The conditions for level control are shown in Fig. 8 in dotted lines. In this case voltage U2 is used for the level control while the other voltage U1 is directly connected to an indicating or relay arrangement.

The phase bridges may be replaced in this embodiment by equivalent means connected in parallel each of which is in phase with a modulation frequency and which are suitably fixed on a common shaft with the modulation or chopper device.

A modified arrangement which is based essentially on the same scheme as the embodiment of Fig. 8 will now be explained preferably by Figs. 11 and 12. Here again use is made of the level control so that a ratio meter may be dispensed with as in the arrangement of Fig. 8. The two radiations I and II and their resulting vector R are shown in Fig. 11. It has been assumed that both radiations are modulated by shifting them in phase by 90° with respect to each other.

Fig. 12 is the corresponding vector diagram for the corresponding voltages U1 and U2 and for the resulting vector UR. The dotted vectors I', II', R' indicate that only proportional magnitudes are transmitted, the factor or magnitude of which depends, for example, upon the sensitivity of the photoelectric cell Z and upon the amplification factor of the amplifier V. The vectors I", II" and R" shown in broken lines indicate another ratio I to II. If the voltage $U_z$ is leveled by control of the feedback from the amplifier output so that it will have a constant value as indicated in Fig. 12 by a parallel line "1" the proportional factor is determined once and for all. In this case the correct absolute values U1 and U2 are obtained from the output of the phase bridges.

In such case the second phase indicator is superfluous. Only one phase bridge and one auxiliary voltage are required to level the amplifier. In this arrangement again the phase bridge may be replaced by a commutator arrangement or by a ring modulator.

Further segregating means which may replace a phase bridge are tube circuits such as push-pull arrangements with dry or contact rectifiers or tubes on which auxiliary voltages are impressed which have a suitable phase relation to the component to be extinguished or selected. If a tube circuit is used, the auxiliary voltage may be used as grid voltage or an anode voltage.

In accordance with a further modification of the invention the different ray paths are modulated at different frequencies, whereby phase bridges or ring modulators may be used. The phase bridges or ring modulators are supplied with suitable different auxiliary frequencies.

Fig. 13 shows by way of example an embodiment of this idea. A chopper disc B1 is provided with two rows 42 and 43 of apertures which develop two different modulation frequencies. The outer row 42 of apertures intercepts the ray path 46 of the source S1 at the frequency $f1$. The inner row 43 of apertures intercepts the ray path 44 of the source S2 at the frequency $f2$. Two phase bridges F1 and F2 are connected in parallel to the output end of the amplifier V and are correlated to the two frequencies $f1$ and $f2$ by impressing on them the two auxiliary voltages of the frequency $f1$ and $f2$ which are developed by the two generators G1 and G2. The two generators $G_1$ and $G_2$ are keyed on the same shaft 47 with the disc $B_1$. It is possible with such phase bridges to separate even relatively closely adjacent frequencies. With tube filter circuits it is only possible to separate frequencies which are much further apart such as may be developed with relatively large expense by a mechano-optical chopper device and by an apertured disc.

Even with the arrangement of Fig. 13 a level control may be utilized as indicated by the dotted lines. If a feedback control is used by connecting the amplifier output directly to its input, one generator and one phase bridge may be omitted as explained in connection with Fig. 16.

A further extension of the invention consists in having both frequencies so closely adjacent that a beat frequency is developed or by arranging the transmission channel such as an amplifier with a non-linear characteristic and by separating the two frequencies so far that one frequency is modulated by the other. The frequencies are preferably selected in such a manner that they fall into the most curved portion of the amplifier characteristic. In case beat frequencies are developed the voltage resulting in the amplifier output is rectified and the direct current component corresponding to the beat frequency is used only for indicating the magnitude of one of the magnitudes to be measured while the voltage of the beat frequency which is not rectified is used for indicating the other magnitude to be measured. Both voltages are impressed as previously described on one of the three different measuring circuits.

Figs. 14 and 15 indicate the different wave shapes of the voltages. Fig. 14 illustrates the voltage derived from the amplifier output. After rectification the voltage appears in the rectifier output as shown in Fig. 15. With known means this voltage is segregated into the direct current component $Ug$ and into the modulation alternating current component $Um$ which is superimposed on the direct current voltage. It is feasible to provide the amplifier again with an automatic level control which maintains constant the direct current voltage component $Ug$. This corresponds in case of modulation to the modulation carrier in case of a beat frequency to the direct current component of the beat frequency. The alternating current component $Um$ indicates directly the ratio of the two radiation components which may be read from a meter calibrated accordingly or may be fed to a corresponding relay for actuating a desired control process.

Figure 16:
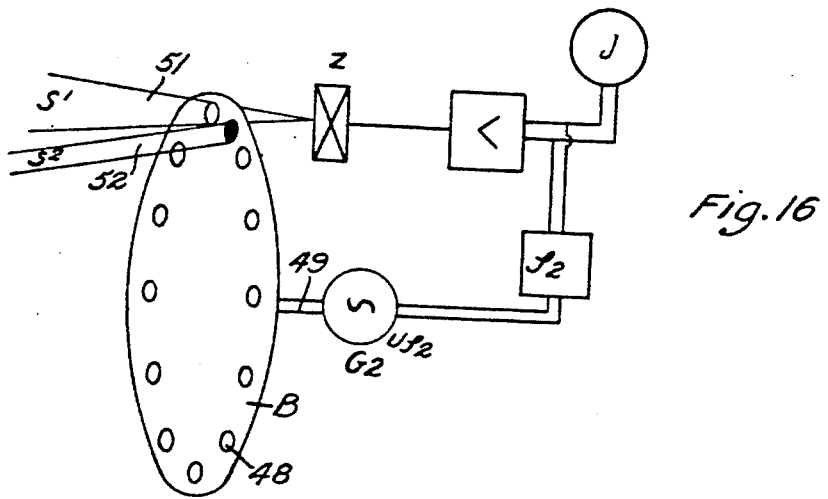

In the modification shown in Fig. 16, a modulator disc B with a single row of apertures 48 is rotated on a shaft 49. On the shaft 49, there is also keyed a generator $G_2$. The ray paths 51 and 52 of the sources of radiator $S_1$ and $S_2$ respectively, impinge after passage through the apertures 48 onto the photoelectric cell Z. The impulses are amplified in an amplifier V and there is provided a phase bridge $\phi_2$, while the output end of the amplifier V is furthermore connected to a meter J. The generator $G_2$ is interconnected to the phase bridge $\phi_2$.

We claim:

A device for measuring the temperatures of two sources of temperature radiation comprising a photoelectric cell for developing electric signals in response to the temperature radiations, an amplifier connected to said cell, a rotary chopper disposed in the paths between the two sources and said cell and rotatable for modulating the radiations from the two sources with a predetermined phase difference of not more than 180°, a phase bridge including two rectifiers and a differential transformer, impedance means coupling the output of said amplifier to said phase bridge for impressing on said phase bridge the output voltages thereof corresponding to the radiations from the two sources, an auxiliary generator coupled to said chopper and revoluble in synchronism therewith, and means impressing the output voltage of said generator on said differential transformer to provide a reference voltage for comparing the output voltages of said amplifier therewith, whereby the signals developed by said cell in response to the radiations of the two sources may be separated, and compared.

References Cited in the file of this patent

UNITED STATES PATENTS

| | | |
|---|---|---|
| 1,672,671 | Young | June 5, 1928 |
| 1,672,672 | Young | June 5, 1928 |
| 1,816,047 | Keuffel | July 28, 1931 |
| 1,970,103 | Runaldue | Aug. 14, 1934 |
| 1,976,461 | Prince | Oct. 9, 1934 |
| 2,096,323 | Gille | Oct. 19, 1937 |
| 2,166,824 | Runaldue | July 18, 1939 |
| 2,198,971 | Neufeld | Apr. 30, 1940 |
| 2,442,298 | Liston | May 25, 1948 |
| 2,451,572 | Moore | Oct. 19, 1948 |
| 2,467,844 | Michel | Apr. 19, 1949 |
| 2,502,319 | Golay | Mar. 28, 1950 |
| 2,503,165 | Meyer | Mar. 28, 1950 |
| 2,528,924 | Vassy | Nov. 7, 1950 |

FOREIGN PATENTS

| | | |
|---|---|---|
| 672,704 | France | Sept. 23, 1929 |

OTHER REFERENCES

An Automatic Recording Infra-Red Spectrophotometer—J. O. S. A. vol. 37, No. 10, October 1947.